(12) United States Patent
Dixit et al.

(10) Patent No.: US 7,930,365 B2
(45) Date of Patent: Apr. 19, 2011

(54) METHOD AND APPARATUS TO MODIFY NETWORK IDENTIFIERS AT DATA SERVERS

(75) Inventors: Vineet Ramesh Dixit, Mountain View, CA (US); Mitesh Dalal, Santa Clara, CA (US); Amol Khare, Sunnyvale, CA (US); Mahadev Somasundaram, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1018 days.

(21) Appl. No.: 11/059,754

(22) Filed: Feb. 16, 2005

(65) Prior Publication Data

US 2006/0184647 A1 Aug. 17, 2006

(51) Int. Cl.
*G06F 15/16* (2006.01)
(52) U.S. Cl. ........................................ 709/219; 709/217
(58) Field of Classification Search .................. 709/217, 709/219
See application file for complete search history.

(56) References Cited

U.S. PATENT DOCUMENTS

| | | | | |
|---|---|---|---|---|
| 6,286,046 | B1 * | 9/2001 | Bryant | 709/224 |
| 7,409,439 | B2 * | 8/2008 | Raja et al. | 709/220 |
| 2002/0062359 | A1 * | 5/2002 | Klopp et al. | 709/219 |
| 2002/0091757 | A1 * | 7/2002 | Cuomo et al. | 709/203 |
| 2004/0049702 | A1 * | 3/2004 | Subramaniam et al. | 713/201 |
| 2005/0097221 | A1 * | 5/2005 | James | 709/239 |
| 2005/0108517 | A1 * | 5/2005 | Dillon et al. | 713/150 |
| 2005/0138204 | A1 * | 6/2005 | Iyer et al. | 709/242 |
| 2005/0256955 | A1 * | 11/2005 | Bodwell et al. | 709/224 |
| 2006/0031929 | A1 * | 2/2006 | Saito | 726/11 |

OTHER PUBLICATIONS

Cooper, I. et al., "Known HTTP Proxy/Caching Problems," Network Working Group, RFC 3143, Jun. 2001, located at: <http://www.ietf.org/rfc/rfc3143.txt?number=3143>, 30 pages.
Fielding, R. et al., "Hypertext Transfer Protocol—HTTP/1.1," Network Working Group, RFC 2616, Jun. 1999, located at: <http://www.ietf.org/rfc/rfc2616.txt?number=2616>, 165 pages.

* cited by examiner

*Primary Examiner* — Hassan Phillips
*Assistant Examiner* — Ryan J Jakovac
(74) *Attorney, Agent, or Firm* — Hickman Palermo Truong & Becker LLP

(57) ABSTRACT

A method of modifying network identifiers at data servers is disclosed. A virtual private network (VPN) gateway server generates a Hypertext Transfer Protocol (HTTP) request. The HTTP request not only requests data from a data server that is within a VPN, but also instructs the data server to modify ("mangle") URLs that are contained within the requested data so that the URLs refer to the VPN gateway server. The VPN gateway server sends the HTTP request toward the data server. As a result, the data server modifies the URLs so that the VPN gateway server does not need to. When such a modified URLs is selected in a web browser, the web browser generates an HTTP request that is directed to the VPN gateway server's URL, which, unlike the unmodified URLs, can be resolved by domain name servers that are outside of the VPN.

16 Claims, 4 Drawing Sheets

202
RECEIVE AN HTTP REQUEST THAT CONTAINS A MANGLED URL THAT INDICATES A URL FOR CLIENT-REQUESTED DATA

204
GENERATE AN HTTP REQUEST HEADER THAT CONTAINS A DIRECTIVE THAT (A) INSTRUCTS AN HTTP SERVER TO MANGLE URLS IN THE REQUESTED DATA AND (B) INDICATES THE URL OF A VPN-SSL GATEWAY

206
GENERATE AN HTTP PROXY REQUEST THAT (A) CONTAINS THE HTTP REQUEST HEADER AND (B) REQUESTS THE CLIENT-REQUESTED DATA

208
SEND THE HTTP PROXY REQUEST TOWARD THE HTTP SERVER THAT STORES THE REQUESTED DATA

210
RECEIVE, FROM THE HTTP SERVER, AN HTTP RESPONSE THAT CONTAINS THE REQUESTED DATA IN WHICH THE URLS HAVE BEEN MANGLED USING THE VPN-SSL GATEWAY'S URL

212
STRIP, FROM THE HTTP RESPONSE, AN INDICATION THAT THE URLS IN THE REQUESTED DATA ALREADY HAVE BEEN MANGLED

214
SEND THE HTTP RESPONSE TOWARD THE CLIENT

302
RECEIVE AN HTTP PROXY REQUEST THAT ORIGINATED FROM A VPN-SSL GATEWAY

304
IN RESPONSE TO A DETERMINATION THAT THE HTTP PROXY REQUEST CONTAINS A DIRECTIVE TO MANGLE URLS, MANGLE URLS WITHIN REQUESTED DATA SO THAT THE MANGLED URLS REFER TO THE VPN-SSL GATEWAY

306
GENERATE AN HTTP RESPONSE HEADER THAT INDICATES THAT THE URLS WITHIN THE REQUESTED DATA ALREADY HAVE BEEN MANGLED

308
GENERATE AN HTTP RESPONSE THAT CONTAINS THE REQUESTED DATA AND THE HTTP RESPONSE HEADER

310
SEND THE HTTP RESPONSE TOWARD THE VPN-SSL GATEWAY

METHOD AND APPARATUS TO MODIFY NETWORK IDENTIFIERS AT DATA SERVERS

FIELD OF THE INVENTION

The present invention generally relates to virtual private networks. The invention relates more specifically to a method and apparatus to modify network identifiers at data servers.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Virtual private network (VPN) technology is now widely used to provide secure communication of information over public or non-trusted networks. In a typical VPN arrangement, an end user is associated with an end station device, such as a workstation or personal computer, which executes VPN client software. The end station establishes a connection through a non-trusted network, such as the public Internet, to a gateway or other network node associated with a secure network of a business enterprise or other entity. The end station and network node negotiate encryption keys, essentially creating an encrypted "tunnel" connection through the un-trusted network. For example, the tunnel may be created using Secure Sockets Layer (SSL). The end station and network node then communicate encrypted information over the un-trusted network, and the encrypted information is decrypted at the endpoints.

In this arrangement, the end user can securely obtain information from private network resources through the VPN tunnel, even though one or more intermediate networks are untrusted. Typical VPN users are enterprise workers who telecommute or telework.

Web pages may be among the private network resources that an end user can obtain. These web pages are served by web server applications using the Hypertext Transfer Protocol (HTTP). There may be multiple web servers within a VPN.

Each web server, and each web page served by a web server, may be associated with a separate Uniform Resource Locator (URL). Because the web servers are located within a VPN, the web servers' associated URLs are not recognized outside of the VPN. Domain name servers that are outside of the VPN are unable to resolve the URLs of web servers that are inside of the VPN. Thus, if the URL of a web page that is served by such a web server is entered into the "address" field of a web browser application, then the web browser indicates that the resource corresponding to the URL cannot be located.

Therefore, to communicate with a web server that is located within a VPN, a web browser first establishes a tunnel with the VPN gateway as discussed above. In certain implementations, to initiate the establishment of the tunnel, the web browser's user enters the VPN gateway's URL into the web browser's "address" field. The web browser sends an HTTP request to the VPN gateway. The VPN gateway responds by initiating an authentication process with the web browser's user.

Provided that the VPN gateway is able to authenticate the web browser's user, the VPN gateway sends a form, such as a Hypertext Markup Language (HTML) form within a "portal page," to the web browser. The form includes a field in which the web browser's user can enter a URL of a web page that is served by a web server within the VPN. The user enters the URL of the desired web page into the field and submits the contents of the form's fields in an HTTP response to the VPN gateway.

The VPN gateway receives the HTTP response. The VPN gateway generates an HTTP proxy request, which requests the web page at the URL that is indicated in the form field. The VPN gateway sends the HTTP proxy request, through the VPN, to the web server that is associated with the URL.

The web server receives the HTTP proxy request and serves the web page to the VPN gateway in an HTTP response. The VPN gateway receives the web page and generates another HTTP response that contains the web page. The VPN gateway sends this HTTP response to the web browser through the tunnel. The web browser receives the web page and displays the web page to the user.

The web page may contain URLs that are associated with other resources in the VPN. For example, the web page may contain HTML links to other web pages within the VPN, or references to images that are stored within the VPN. Domain name servers outside of the VPN are unable to resolve such URLs. Assuming that no remedial action has been taken to compensate for this fact, if the user selects one of the links—by clicking on the link, for example—then the web browser indicates that the resource corresponding to the URL cannot be located. Similarly, the web browser will be unable to download an object, such as an image, at such a URL.

In order to compensate for this fact, the VPN gateway may perform operations on the web page prior to sending the web page to the web browser. More specifically, the VPN gateway may modify the URLs in the web page so that the URLs refer to the VPN gateway's URL. Each modified URL retains destination information that indicates the resource to which the URL originally referred, though. Modifying a URL in this manner is called "mangling" the URL. After the VPN gateway has mangled the URLs, the VPN gateway sends the web page, with the mangled URLs, to the web browser.

When the user selects a link that corresponds to a mangled URL, the web browser sends an HTTP request, through the tunnel, to the VPN gateway. The HTTP request indicates the destination information that was retained in the mangled URL. The VPN gateway receives the HTTP request and parses the destination information that is indicated therein. In a manner similar to that described above, the VPN gateway generates an HTTP proxy request that requests the web page at the original URL that the destination information indicates. The VPN gateway sends the HTTP proxy request, through the VPN, to the web server that is associated with the original URL.

As a result, the links in the web pages that the VPN gateway returns to the web browser still function as intended even though the resources to which the links refer might be within the VPN.

The process of mangling URLs is a lot of work for the VPN gateway to perform, though. The VPN gateway typically is a "bottleneck" in communications between processes executing within the VPN and processes executing outside of the VPN, so the VPN gateway's workload is often significant even if the URL mangling tasks are not considered. Because URL mangling is such a computationally expensive operation, it is often becomes necessary to implement the VPN gateway using specialized and expensive high-end computing machinery.

Thus, there is a need for a method or apparatus that can reduce the VPN gateway's workload so that the VPN gateway can be implemented using more general-purpose and less expensive computing machinery. More specifically, there is a need for a method or apparatus that can offload URL mangling from the VPN gateway.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram of a technique for offloading URL mangling from a VPN-SSL gateway by instructing HTTP server-recipients of HTTP proxy requests to perform the URL mangling instead;

FIG. 3 is a flow diagram of a technique for offloading URL mangling from a VPN-SSL gateway by mangling URLs in response to an instruction from the VPN-SSL gateway.

DETAILED DESCRIPTION

A method and apparatus to modify network identifiers, such as URLs, at data servers, such as HTTP servers, is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Offloading URL Mangling
3.0 Implementation Mechanisms—Hardware Overview
4.0 Extensions and Alternatives 1.0 General Overview The needs identified in the foregoing Background, and other needs and objects that will become apparent for the following description, are achieved in the present invention, which comprises, in one aspect, a method to modify network identifiers at data servers.

When a VPN gateway server receives an HTTP request from a client that is located outside of the VPN, the VPN gateway server generates an HTTP proxy request on behalf of the client. The HTTP proxy request not only requests data from a web server that is within the VPN, but also instructs the web server to mangle URLs that are contained within the requested data so that the URLs refer to the VPN gateway server. The VPN gateway server sends the HTTP request toward the web server.

The web server that receives the HTTP proxy request can determine from the VPN gateway server's instruction contained therein that the web server is supposed to perform the URL mangling. Before returning the requested data to the VPN gateway server, the web server mangles the URLs contained in the requested data. The task of mangling the URLs is therefore offloaded from the VPN gateway server to the web server.

In other aspects, the invention encompasses a computer apparatus and a computer-readable medium configured to carry out the foregoing steps.

2.0 Offloading URL Mangling 2.1 Structural Overview

Figure 1:
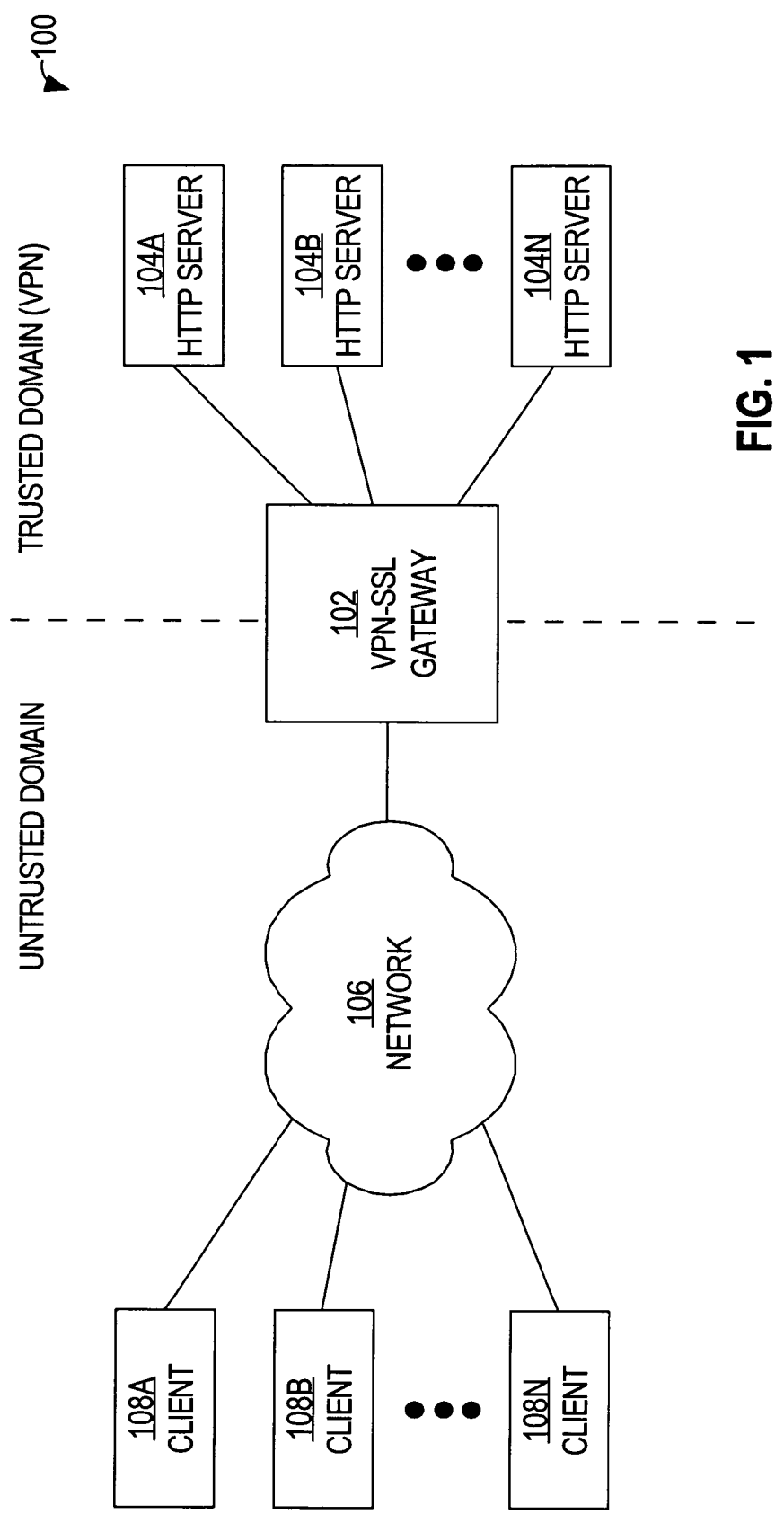
FIG. 1 is a block diagram of a network arrangement in which the task of mangling URLs is offloaded from a VPN-SSL gateway to HTTP servers within the VPN.

FIG. 1 is a block diagram of a network arrangement in which the task of mangling URLs is offloaded from a VPN-SSL gateway to HTTP servers within the VPN. The network arrangement comprises a VPN-SSL gateway 102. VPN-SSL gateway 102 may be implemented within a network router, for example.

VPN-SSL gateway 102 is coupled communicatively with HTTP servers 104A-N. Each of HTTP servers 104A-N may be a separate computer. Alternatively, each of HTTP servers 104A-N may be a separate process executing on the same computer or on separate computers. For example, each of HTTP servers 104A-N may be a separate web server process.

HTTP servers 104A-N are located in a trusted network domain, within a VPN. Each of HTTP server 104A-N is associated with a separate URL. For example, HTTP server 104A might be associated with URL "wwwin.cisco.com", and HTTP server 104B might be associated with URL "wf.cisco.com". Because HTTP servers 104A-N are located within a VPN, domain name servers outside of the VPN, in the untrusted network domain, are not capable of resolving the URLs of HTTP servers 104A-N.

However, VPN-SSL gateway 102 is associated with a URL that can be resolved by domain name servers outside of the VPN. For example, VPN-SSL gateway 102 might be associated with URL "www.sslvpn-gw.com". Thus, VPN-SSL gateway 102 acts as an intermediary for entities in the untrusted domain that communicate with entities in the trusted domain.

VPN-SSL gateway 102 also is coupled communicatively with a network 106. Network 106 is a computer network, such as, for example, a local area network (LAN), wide area network (WAN), or internetwork such as the Internet. Clients 108A-N also are coupled communicatively with network 106. Each of clients 108A-N may be a separate computer. Alternatively, each of clients 108A-N may be a separate process executing on the same computer or on separate computers. For example, each of clients 108A-N may be a separate web browser process.

Clients 108A-N are located in an untrusted network domain, outside of the VPN in which HTTP servers 104A-N are located. Clients 108A-N can only communicate with HTTP servers 104A-N via VPN-SSL gateway 102. Communications between clients 108A-N and VPN-SSL gateway 102 are sent through encryption-protected tunnels so that other parties in the untrusted domain cannot make use of any such communications that they might intercept.

When clients 108A-N need to request data from HTTP servers 104A-N, clients 108A-N do so by sending HTTP requests to VPN-SSL gateway 102. The HTTP requests indicate mangled URLs. The URL for VPN-SSL gateway 102 prefaces such mangled URLs so that the HTTP requests are routed to VPN-SSL gateway 102. Somewhere following the URL of VPN-SSL gateway 102, such mangled URLs also contain the URL that is associated with the requested data that is stored by one of HTTP servers 104A-N. For example, a mangled URL might look like "www.sslvpn-gw.com/http/0/wwwin.cisco.com/info.htm", where the portion "wwwin.cisco.com/info.htm" is the URL that is associated with the requested data that is stored by HTTP server 104A.

When VPN-SSL gateway 102 receives a mangled URL, VPN-SSL gateway 102 inspects the mangled URL to determine the URL that is associated with the requested data. VPN-SSL gateway 102 generates an HTTP proxy request and sends the HTTP proxy request to the HTTP server that stores the requested data as indicated by the URL. In the above example, VPN-SSL gateway 102 would send the HTTP proxy request to HTTP server 104A, which is associated with URL "wwwin.cisco.com" and which stores the file "info.htm".

However, before VPN-SSL gateway 102 sends the HTTP proxy request, VPN-SSL gateway 102 inserts, into the HTTP proxy request, a directive that instructs the destination HTTP server to perform URL mangling, in the manner described below.

2.2 Operational Techniques

FIG. 2 is a flow diagram of a technique for offloading URL mangling from a VPN-SSL gateway by instructing HTTP server-recipients of HTTP proxy requests to perform the URL mangling instead. For purposes of illustrating a clear example, the technique of FIG. 2 is described below with reference to the example network arrangement of FIG. 1. However, embodiments of the technique of FIG. 2 are not limited to the context of FIG. 1.

In block 202, an HTTP request that originated from a client is received. The HTTP request indicates a mangled URL. The mangled URL indicates a URL that is associated with data that the client is requesting. For example, VPN-SSL gateway 102 may receive an HTTP request that originated from client 108A. The HTTP request may indicate a mangled URL such as "www.sslvpn-gw.com/http/0/wwwin.cisco.com/info.htm", where "wwwin.cisco.com/info.htm" is the URL that is associated with the web page that client 108A is requesting.

In one embodiment, VPN-SSL gateway 102 determines that the URL is a mangled URL based on the presence of the protocol ("http") and port ("0") identifiers within the mangled URL. In response to making such a determination, VPN-SSL gateway 102 handles the mangled URL in the manner described below.

In block 204, an HTTP request header is generated. The HTTP request header contains a directive that instructs an HTTP server to mangle URLs contained within the requested data. The HTTP request header also indicates the URL of the VPN-SSL gateway that received the HTTP request in block 202. For example, VPN-SSL gateway 102 may generate an HTTP request header that contains a string such as "Content-Modify-Reference: www.sslvpn-gw.com", where "Content-Modify-Reference" is the directive, and "www.sslvpn-gw.com" is the URL of VPN-SSL gateway 102.

In block 206, an HTTP proxy request that contains the HTTP request header is generated. The HTTP proxy request requests the data that was requested in the HTTP request received in block 202. For example, VPN-SSL gateway 102 may generate an HTTP proxy request that contains the HTTP request header described above, and that indicates the URL "wwwin.cisco.com/info.htm".

In block 208, the HTTP proxy request is sent toward the HTTP server that stores the requested data. For example, VPN-SSL gateway 102 may send the HTTP proxy request toward HTTP server 104A, which, in the above example, is associated with the URL "wwwin.cisco.com".

Because the HTTP server recognizes the directive in the HTTP request header, the HTTP server mangles the URLs in the requested data prior to sending the requested data in an HTTP response to the VPN-SSL gateway. Additionally, when the HTTP server performs such URL mangling, the HTTP server indicates, in the HTTP response, that the URL mangling has been performed, so that the VPN-SSL gateway knows that no further URL mangling needs to take place relative to the data in the HTTP response. An example of a technique that incorporates these operations that the HTTP server may perform is described below with reference to FIG. 3.

In block 210, an HTTP response that originated from the HTTP server is received. The HTTP response contains the requested data, in which the URLs have been mangled so that the VPN-SSL gateway's URL prefaces them. For example, if the web page "info.htm" originally contained the URL "wf.cisco.com/moreinfo.htm", then the version of the web page received by VPN-SSL gateway 102 from HTTP server 104A would contain, instead, the mangled URL "www.sslvpn-gw.com/http/0/wf.cisco.com/moreinfo.htm".

The HTTP response also contains an indication that the URL mangling has already been performed. For example, the HTTP response may contain an HTTP response header that contains a string such as: "Content-Reference-Modified". VPN-SSL gateway 102 recognizes from this directive that HTTP server 104A has already performed the URL mangling needed relative to the data contained in the HTTP response; VPN-SSL gateway 102 does not need to perform URL mangling relative to the data.

In block 212, the indication that the URL mangling has already been performed is stripped from the HTTP response. For example, VPN-SSL gateway 102 may remove, from the HTTP response, the HTTP response header that contains the "Content-Reference-Modified" string.

In block 214, the HTTP response is sent toward the client. For example, VPN-SSL gateway 102 may send the HTTP response toward client 108A through an encryption-protected tunnel.

Thus, the VPN-SSL gateway is relieved from the burden of mangling URLs in data that passes through the VPN-SSL gateway. The burden is distributed among the HTTP servers that store the data on which the URL mangling needs to be performed. Consequently, the VPN-SSL gateway may be implemented using more general-purpose and less expensive computing machinery. For example, VPN-SSL gateway may be implemented within a network router.

In one embodiment, if the VPN-SSL gateway determines that the HTTP response received from the HTTP server does not contain an indication that the HTTP server already mangled the URLs contained within the HTTP response, then the VPN-SSL gateway mangles the URLs contained within the HTTP response prior to sending the HTTP response toward the client. Thus, in this embodiment, the VPN-SSL gateway compensates for the possibility that some HTTP servers might not recognize the directive that instructs an HTTP server to mangle URLS.

FIG. 3 is a flow diagram of a technique for offloading URL mangling from a VPN-SSL gateway by mangling URLs in response to an instruction from the VPN-SSL gateway. For purposes of illustrating a clear example, the technique of FIG. 3 is described below with reference to the example network arrangement of FIG. 1. However, embodiments of the technique of FIG. 3 are not limited to the context of FIG. 1.

In block 302, an HTTP proxy request that originated from a VPN-SSL gateway is received. The HTTP proxy request requests data that is stored by an HTTP server. The HTTP request header also contains a directive that instructs the HTTP server to mangle URLs contained within the requested data before sending the requested data toward the VPN-SSL gateway. The HTTP request header also indicates the URL of the VPN-SSL gateway from which the HTTP proxy request originated.

For example, HTTP server 104A may receive an HTTP proxy request that originated from VPN-SSL gateway 102. The HTTP proxy request may request the web page "info.htm". The HTTP proxy request also may contain an HTTP request header that contains a string such as "Content-Modify-Reference: www.sslvpn-gw.com", where "Content- Modify-Reference" is the directive, and "www.sslvpn-gw.com" is the URL of VPN-SSL gateway 102.

In block 304, in response to a determination that the HTTP proxy request contains the directive, URLs contained within the requested data are mangled so that the URLs refer to the VPN-SSL gateway. The URL of the VPN-SSL gateway indicated in the directive is the URL that the HTTP server prepends to the original URLs in the course of mangling the original URLs. For example, HTTP server 104A may determine that the HTTP proxy request contains the string "Content-Modify-Reference: www.sslvpn-gw.com". If the web page "info.htm" contains the URL "wf.cisco.com/moreinfo.htm", then HTTP server 104A may mangle the URL so that the web page contains, instead, the mangled URL "www.sslvpn-gw.com/http/0/wf.cisco.com/moreinfo.htm".

In block 306, an HTTP response header is generated. The HTTP response header contains a directive that instructs the VPN-SSL gateway that the URLs within the requested data already have been mangled. For example, HTTP server 104A may generate an HTTP response header that contains a string such as "Content-Reference-Modified".

In block 308, an HTTP response that contains the HTTP response header and the requested data (in which the URLs have been mangled) is generated. For example, HTTP server 104A may generate an HTTP response that contains the HTTP response header described above, as well as the version of the web page "info.htm" that contains the mangled URLs.

In block 310, the HTTP response is sent toward the VPN-SSL gateway. For example, HTTP server 104A may send the HTTP response toward VPN-SSL gateway 102.

In one embodiment, if an HTTP server is unable to perform URL mangling on at least some of the requested data, then the HTTP server does not insert the HTTP response header discussed above into the HTTP response. The absence of the HTTP response header causes the VPN-SSL gateway to perform the URL mangling on the data received in the HTTP response before forwarding the HTTP response to the appropriate client.

2.3 Implementation Options

In one embodiment, the HTTP request header discussed above follows this format:

| | |
|---|---|
| Content-Modify-Reference | = "Content-Modify-Reference" ":" sslvpn-gateway *(media-range [modify-params]) |
| sslvpn-gateway | = host [ ":" port] ";" |
| media-range | = ("*/*" | (type "/" "*") | (type "/" subtype)). |
| modify-params | = ";" (0 | 1) |

The HTTP request header may be included with other HTTP headers in an HTTP request. As can be seen from the above format, the HTTP request header may indicate one or more media types and, for each media type, whether the HTTP server should perform URL mangling on URLs that are within data of that media type. For example, if an HTTP server received an HTTP request header that contained the string, "Content-Modify-Reference: www.sslvpn-gw.com; text/html;0 text/xml;1" then the HTTP server would understand that the HTTP server should not mangle URLs in html-type data (because of the "0" following "text/html"), but that the HTTP server should mangle URLs in xml-type data (because of the "1" following "text/xml"). If no media types are specified, then the default understanding is that the HTTP server should mangle URLs in data of any media type.

In one embodiment, the HTTP response header discussed above follows this format:

| | |
|---|---|
| Content-Reference-Modified | = "Content-Reference-Modified" ":" sslvpn-gateway |
| sslvpn-gateway | = host [ ":" port] ";" |

It is possible that multiple VPN-SSL gateways might reside on the same computing machinery. In such a scenario, the HTTP response might be received by all of the VPN-SSL gateways on a particular machine. Each VPN-SSL gateway may inspect the host indicated in the HTTP response header to determine if the HTTP response is meant for that VPN-SSL gateway. If an HTTP response header indicates a host other than the VPN-SSL gateway that is inspecting the HTTP response header, then that VPN-SSL gateway may take specified actions, such as ignoring the HTTP response.

3.0 Implementation Mechanisms—Hardware Overview

Figure 4:
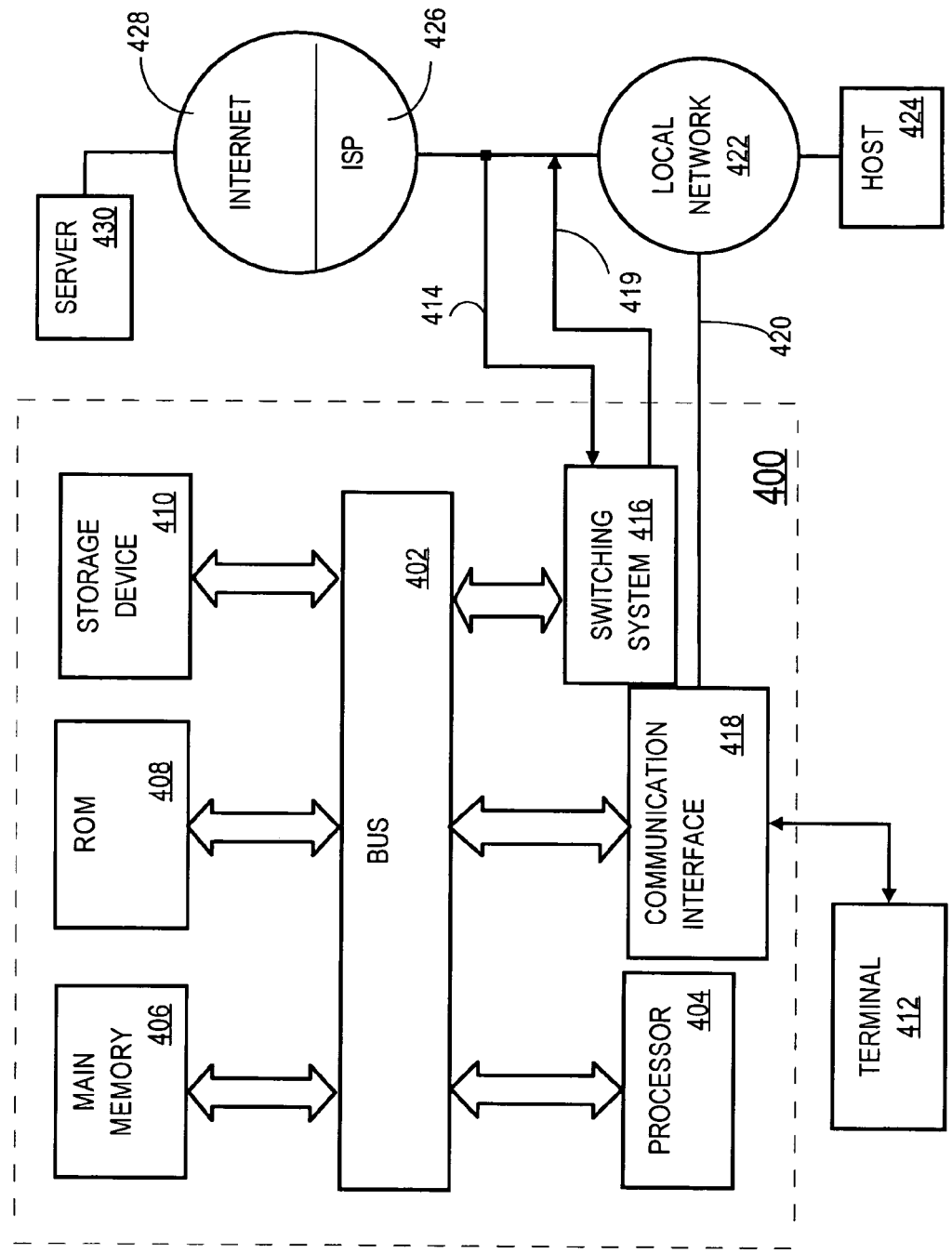
FIG. 4 is a block diagram that illustrates a computer system upon which an embodiment may be implemented.

FIG. 4 is a block diagram that illustrates a computer system 400 upon which an embodiment of the invention may be implemented. One embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for offloading URL mangling from a VPN-SSL gateway to HTTP servers. According to one embodiment of the invention, such offloading is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for offloading URL mangling as described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, although certain embodiments are described above with reference to mangling URLs within web pages, embodiments of the invention are applicable to mangle URLs within any kind of data, including Javascript, Java Applets, MacroMedia Flash, etc.

For another example, although, in certain embodiments are described above, HTTP servers 104A-N are within a private domain and clients 108A-N are within a public domain, the invention is not limited to such an arrangement. In certain embodiments, both HTTP servers 104A-N and clients 108A-N may be within the same domain, and that domain may be a public domain or a private domain. Alternatively, in certain embodiments, HTTP servers 104A-N may be within a public domain, and clients 108A-N may be within a private domain.

What is claimed is:

1. A method of offloading Uniform Resource Locator (URL) mangling, the method comprising the steps of:

a gateway server receiving a first Hypertext Transfer Protocol (HTTP) request that indicates a first URL of a file that is stored by a first HTTP server, wherein the file contains a second URL that cannot be resolved by domain name servers that are outside of a virtual private network (VPN) that contains the first HTTP server;

the gateway server generating a second HTTP request to the first HTTP server, wherein the second HTTP request requests the file from the first HTTP server, wherein the second HTTP request contains a first directive that (a)

indicates that the first HTTP server should modify URLs in the file, and (b) indicates a URL of a gateway server for the VPN;

the gateway server sending the second HTTP request toward the first HTTP server;

the gateway server receiving an HTTP response that contains the file, in which the second URL has been modified so that the URL of the gateway server precedes information that was previously contained in the second URL;

the gateway server determining that the HTTP response contains a second directive that indicates that URLs in the file have been modified;

in response to determining that the HTTP response contains the second directive, the gateway server removing the second directive from the HTTP response; and after removing the second directive from the HTTP response, the gateway server sending the HTTP response toward a client from which the first HTTP request originated;

wherein the method is performed by one or more computing devices.

2. An apparatus comprising:

a network interface that is coupled to a data network for receiving one or more packet flows therefrom;

a processor;

one or more stored sequences of instructions which, when executed by the processor, cause the processor to carry out the steps of:

a gateway server receiving a first Hypertext Transfer Protocol (HTTP) request that indicates a first URL of a file that is stored by a first HTTP server, wherein the file contains a second URL that cannot be resolved by domain name servers that are outside of a virtual private network (VPN) that contains the first HTTP server;

the gateway server generating a second HTTP request to the first HTTP server, wherein the second HTTP request requests the file from the first HTTP server, wherein the second HTTP request contains a first directive that (a) indicates that the first HTTP server should modify URLs in the file, and (b) indicates a URL of a gateway server for the VPN;

the gateway server sending the second HTTP request toward the first HTTP server;

the gateway server receiving an HTTP response that contains the file, in which the second URL has been modified so that the URL of the gateway server precedes information that was previously contained in the second URL;

the gateway server determining that the HTTP response contains a second directive that indicates that URLs in the file have been modified;

in response to determining that the HTTP response contains the second directive, the gateway server removing the second directive from the HTTP response; and after removing the second directive from the HTTP response, the gateway server sending the HTTP response toward a client from which the first HTTP request originated.

3. A method as recited in claim 1, further comprising the steps of:

receiving a second HTTP response that contains second data, wherein the second HTTP response originated from the HTTP server;

determining whether the second HTTP response indicates that the HTTP server modified one or more second URLs in the second HTTP response;

if the second HTTP response does not indicate that the HTTP server modified the second one or more URLs, then modifying the second one or more URLs so that the second one or more URLs refer to the gateway server; and sending the second HTTP response toward a second client that requested the second data.

4. A method as recited in claim 1, further comprising the steps of:

receiving a second HTTP request that indicates a URL of the gateway server as a consequence of a particular URL having been modified by the HTTP server, wherein the particular URL contains a URL that is associated with a particular HTTP server;

generating a third HTTP request that is based on the second HTTP request; and sending the third HTTP request toward the particular HTTP server.

5. A method as recited in claim 1, wherein the step of generating a new HTTP request comprises the step of:

generating an HTTP request header that indicates a URL of the gateway server.

6. A non-transitory computer-readable medium carrying one or more sequences of instructions which, when executed by one or more processors, cause the one or more processors to carry out the steps of:

a gateway server receiving a first Hypertext Transfer Protocol (HTTP) request that indicates a first URL of a file that is stored by a first HTTP server, wherein the file contains a second URL that cannot be resolved by domain name servers that are outside of a virtual private network (VPN) that contains the first HTTP server;

the gateway server generating a second HTTP request to the first HTTP server, wherein the second HTTP request requests the file from the first HTTP server, wherein the second HTTP request contains a first directive that (a) indicates that the first HTTP server should modify URLs in the file, and (b) indicates a URL of a gateway server for the VPN; the gateway server sending the second HTTP request toward the first HTTP server;

the gateway server receiving an HTTP response that contains the file, in which the second URL has been modified so that the URL of the gateway server precedes information that was previously contained in the second URL;

the gateway server determining that the HTTP response contains a second directive that indicates that URLs in the file have been modified;

in response to determining that the HTTP response contains the second directive, the gateway server removing the second directive from the HTTP response; and after removing the second directive from the HTTP response, the gateway server sending the HTTP response toward a client from which the first HTTP request originated.

7. A medium as recited in claim 6, further comprising instructions which, when executed by the one or more processors, cause the one or more processors to carry out the step of:

receiving a second HTTP response that contains second data, wherein the second HTTP response originated from the HTTP server;

determining whether the second HTTP response indicates that the HTTP server modified one or more second URLs in the second HTTP response;

if the second HTTP response does not indicate that the HTTP server modified the second one or more URLs, then modifying the second one or more URLs so that the second one or more URLs refer to the gateway server; and sending the second HTTP response toward a second client that requested the second data.

8. A medium as recited in claim 6, further comprising instructions which, when executed by the one or more processors, cause the one or more processors to carry out the step of:

receiving a second HTTP request that indicates a URL of the gateway server as a consequence of a particular URL having been modified by the HTTP server, wherein the particular URL contains a URL that is associated with a particular HTTP server;

generating a third HTTP request that is based on the second HTTP request; and sending the third HTTP request toward the particular HTTP server.

9. A medium as recited in claim 6, further comprising instructions which, when executed by the one or more processors, cause the one or more processors to carry out the step of:

generating an HTTP request header that indicates a URL of the gateway server.

10. An apparatus, comprising:

means for receiving a first Hypertext Transfer Protocol (HTTP) request that indicates a first URL of a file that is stored by a first HTTP server, wherein the file contains a second URL that cannot be resolved by domain name servers that are outside of a virtual private network (VPN) that contains the first HTTP server;

means for generating a second HTTP request to the first HTTP server, wherein the second HTTP request requests the file from the first HTTP server, wherein the second HTTP request contains a first directive that (a) indicates that the first HTTP server should modify URLs in the file, and (b) indicates a URL of a gateway server for the VPN;

means for sending the second HTTP request toward the first HTTP server;

means for receiving an HTTP response that contains the file, in which the second URL has been modified so that the URL of the gateway server precedes information that was previously contained in the second URL;

means for determining that the HTTP response contains a second directive that indicates that URLs in the file have been modified;

means for, in response to determining that the HTTP response contains the second directive, removing the second directive from the HTTP response; and means for, after removing the second directive from the HTTP response, sending the HTTP response toward a client from which the first HTTP request originated.

11. An apparatus as recited in claim 10, further comprising:

means for receiving a second HTTP response that contains second data, wherein the second HTTP response originated from the HTTP server;

means for determining whether the second HTTP response indicates that the HTTP server modified one or more second URLs in the second HTTP response;

means for modifying the second one or more URLs so that the second one or more URLs refer to the gateway server, in response to determining that the second HTTP response does not indicate that the HTTP server modified the second one or more URLs; and means for sending the second HTTP response toward a second client that requested the second data.

12. An apparatus as recited in claim 10, further comprising:

means for receiving a second HTTP request that indicates a URL of the gateway server as a consequence of a particular URL having been modified by the HTTP server, wherein the particular URL contains a URL that is associated with a particular HTTP server;

means for generating a third HTTP request that is based on the second HTTP request; and means for sending the third HTTP request toward the particular HTTP server.

13. An apparatus as recited in claim 10, further comprising:

means for generating an HTTP request header that indicates a URL of the gateway server.

14. An apparatus as recited in claim 2, wherein the one or more stored sequences of instructions further comprise instructions which, when executed by the processor, cause the processor to carry out the steps of:

receiving a second HTTP response that contains second data, wherein the second HTTP response originated from the HTTP server;

determining whether the second HTTP response indicates that the HTTP server modified one or more second URLs in the second HTTP response;

if the second HTTP response does not indicate that the HTTP server modified the second one or more URLs, then modifying the second one or more URLs so that the second one or more URLs refer to the gateway server; and sending the second HTTP response toward a second client that requested the second data.

15. An apparatus as recited in claim 2, wherein the one or more stored sequences of instructions further comprise instructions which, when executed by the processor, cause the processor to carry out the steps of:

receiving a second HTTP request that indicates a URL of the gateway server as a consequence of a particular URL having been modified by the HTTP server, wherein the particular URL contains a URL that is associated with a particular HTTP server;

generating a third HTTP request that is based on the second HTTP request; and sending the third HTTP request toward the particular HTTP server.

16. An apparatus as recited in claim 2, wherein the one or more stored sequences of instructions further comprise instructions which, when executed by the processor, cause the processor to carry out the steps of:

generating an HTTP request header that indicates a URL of the gateway server.

* * * * *